(12) United States Patent
Duggan et al.

(10) Patent No.: US 10,083,070 B2
(45) Date of Patent: *Sep. 25, 2018

(54) LOG FILE REDUCTION ACCORDING TO PROBLEM-SPACE NETWORK TOPOLOGY

(71) Applicant: International Business Machines Corporation, Armonk, NY (US)

(72) Inventors: Matthew Duggan, Surrey (GB); Kristian Stewart, Surrey (GB); Zhenni Yan, London (GB)

(73) Assignee: International Business Machines Corporation, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/059,675

(22) Filed: Oct. 22, 2013

(65) Prior Publication Data

US 2014/0250333 A1  Sep. 4, 2014

Related U.S. Application Data

(63) Continuation of application No. 13/784,579, filed on Mar. 4, 2013.

(51) Int. Cl.
 *G06F 11/00* (2006.01)
 *G06F 11/07* (2006.01)
 *H04L 12/24* (2006.01)

(52) U.S. Cl.
 CPC ........ *G06F 11/079* (2013.01); *G06F 11/0709* (2013.01); *H04L 41/069* (2013.01)

(58) Field of Classification Search
 CPC ... G06F 11/0709; G06F 11/079; H04L 41/069
 See application file for complete search history.

(56) References Cited

U.S. PATENT DOCUMENTS

| | | | |
|---|---|---|---|
| 7,721,152 B1 | 5/2010 | Joshi et al. | |
| 2005/0015685 A1* | 1/2005 | Yamamoto | 714/54 |
| 2007/0204215 A1 | 8/2007 | Mueller et al. | |
| 2009/0070455 A1 | 3/2009 | Cervantes | |
| 2009/0138595 A1 | 5/2009 | Sluiman et al. | |
| 2011/0060946 A1* | 3/2011 | Gupta et al. | 714/26 |

(Continued)

OTHER PUBLICATIONS

Zawawy, et al., "Log filtering and interpretation for root cause analysis," ICSM, IEE, Sep. 2010.

(Continued)

*Primary Examiner* — Jason B Bryan
(74) *Attorney, Agent, or Firm* — Steven M. Greenberg, Esq.; CRGO Law

(57) ABSTRACT

Embodiments of the invention provide a method, system and computer program product for log file reduction according to problem space topology. A method for log file reduction according to problem space topology can include receiving a fault report for a fault in a solution executing in memory of one or more computers of a computer data processing system. The method further can include extracting references to at least two resources of the computer data processing system from the fault report. The method yet further can include filtering a set of all log files for the computer data processing system to only a subset of log files related to the at least two resources. Finally, the method can include displaying the subset of log files in a log file analyzer.

4 Claims, 2 Drawing Sheets

(56) References Cited

U.S. PATENT DOCUMENTS

2011/0191394 A1* 8/2011 Winteregg et al. ........... 707/822
2013/0185592 A1* 7/2013 Fleming et al. ................ 714/37
2014/0025995 A1* 1/2014 Narayanan ..................... 714/37

OTHER PUBLICATIONS

Chuah, et al., "Diagnosing the Root-Causes of Failures From Cluster Log Files," IEEE, Dec. 2010.
IBM, "System and Method for Efficient Search and Retrieval of Log File Records for Hierarchical Data," ip.com, Mar. 22, 2006.
Zawawy, "Requirement-Based Root Cause Analysis Using Log Data," Univ. of Waterloo, Aug. 14, 2012.

* cited by examiner

LOG FILE REDUCTION ACCORDING TO PROBLEM-SPACE NETWORK TOPOLOGY

CROSS-REFERENCE TO RELATED APPLICATIONS

This application is a Continuation of U.S. application Ser. No. 13/784,579, filed Mar. 4, 2013, currently pending, the entirety of which is incorporated herein by reference.

BACKGROUND OF THE INVENTION

Field of the Invention

The present invention relates to log file analysis for computer troubleshooting and more particularly to log file reduction to facilitate log file analysis.

Description of the Related Art

System fault troubleshooting can be a task range from the simple to the complex. In the most basic computing system, fault troubleshooting can involve only the manual inspection of the state of one or two components of a computer and the operating system of the computer. In more complex network arrangement, however, where multiple computers are coupled to one another over different communicative linkages, each running different applications that in the aggregation provide a computing solution, troubleshooting a solution fault can be a daunting task. Consequently, systems administrators generally rely upon the different operational logs produced by the different computing resources of the solution in order to identify the source or sources of a system fault.

Over a period of time during which different resources of a computing solution are operational, log files can become voluminous depending upon the frequency of logging events. To facilitate the management of log files, log files can be indexed and managed using traditional database technologies. The indexing of log files provides for very fast access to different log entries, and more importantly, permits the keyword searching of the log files. To wit, when troubleshooting a solution fault, help desk personnel oftentimes utilize data provided by the end user to keyword search different log files seeking the pertinent records likely to provide clues as to the cause of the solution fault.

Keyword searching log files to pinpoint the source of a solution fault can be troublesome in the face of many log files each recording volumes of events. In particular, many log file entries and indeed some log files may pertain only to portions of a solution topology not relevant to the fault at hand. Yet, the end user still must process each keyword search result in each log file when keyword searching the various log files of the entire topology. Accordingly, the keyword searching of log files generally is one-dimensional in nature and can result in the most interesting and pertinent logged events being lost in a sea of irrelevant events.

BRIEF SUMMARY OF THE INVENTION

Embodiments of the present invention address deficiencies of the art in respect to log file searching and provide a novel and non-obvious method, system and computer program product for log file reduction according to problem space topology. In an embodiment of the invention, a method for log file reduction according to problem space topology can include receiving a fault report for a fault in a solution executing in memory of one or more computers of a computer data processing system. For example, the fault report can be a message from an end user of the solution. The method further can include extracting references to at least two resources of the computer data processing system from the fault report. The references can include by way of example, computers in the computer data processing system and switches utilized in a computer communications network communicatively coupling together the computers, or applications executing in memory of computers in the computer data processing system. The method yet further can include filtering a set of all log files for the computer data processing system to only a subset of log files related to the at least two resources. Finally, the method can include displaying the subset of log files in a log file analyzer.

In one aspect of the embodiment, the method additionally can include keyword searching the subset of log files. In another aspect of the embodiment, the method can include computing an intermediate resource disposed within a communications pathway between the two resources and including in the subset log files associated with the intermediate resource.

In another embodiment of the invention, a computer data processing system can be configured for log file reduction according to problem space topology. The system can include a client computer with memory and at least one processor and coupled to a computer data processing system of one or more computers communicatively coupled to one another over a computer communications network through one or more switches. The computer data processing system also can host one or more computer programs providing a computing solution to an end user. The system additionally can include log files generated by different resources in the computer data processing system and a log file analyzer executing in memory of the client computer and configured to keyword search log files loaded for analysis in the log file analyzer. Finally, the system can include a log file reduction module coupled to the log file analyzer and executing in the memory of the client computer. The module can include program code enabled to receive a fault report for a fault in the solution, to extract references to at least two resources of the computer data processing system from the fault report, to filter the log files to only a subset of log files related to the at least two resources and to display the subset of log files in the log file analyzer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for log file reduction according to problem space topology. In accordance with an embodiment of the invention, a report of a solution fault can be received and at least two resources of a computing topology for a computing system providing the solution can be determined from the report. A subset of a set of logs for the computing system can be mapped to the two resources and only the subset of the logs can be presented in a user interface for review of logged events associated with the solution fault. Optionally, a third resource in communication with both of the two resources can be identified and logs for the third resource also can be presented in the user interface. In this way, the number of logs presented for review and keyword searching in order to troubleshoot the solution fault can be reduced according to the topology pertaining specifically to the solution fault as expressed in the report of the solution fault.

Figure 1:
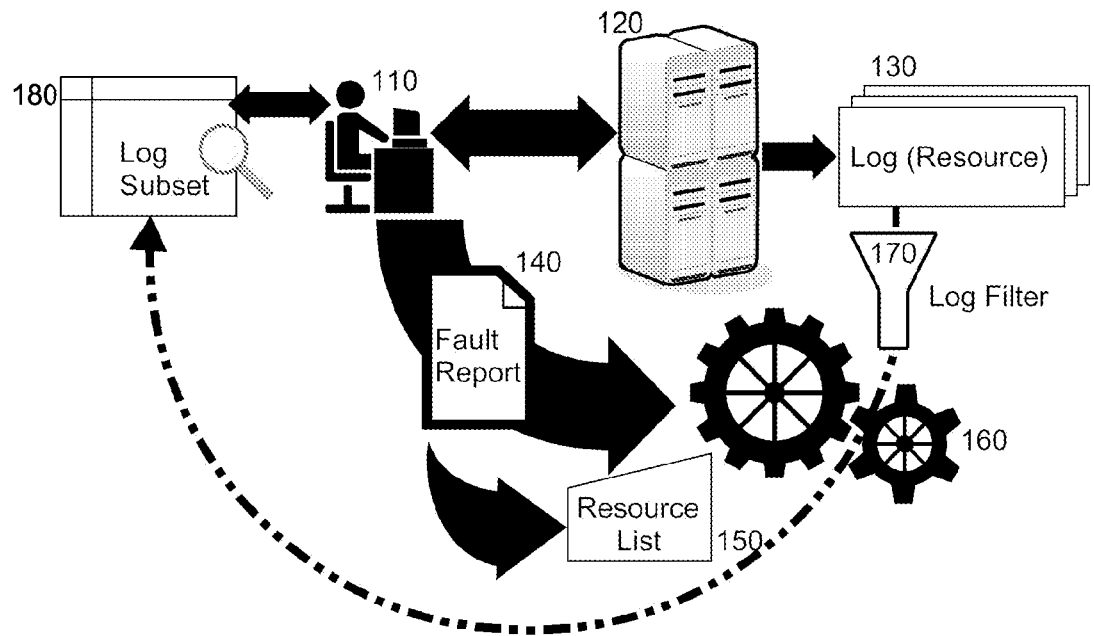
FIG. 1 is a pictorial illustration of a process for log file reduction according to problem space topology.

In further illustration, FIG. 1 is a pictorial illustration of a process for log file reduction according to problem space topology. As shown in FIG. 1, an end user 110 can provide a fault report 140 in respect to a solution fault for a solution provided by a computer data processing system 120. The solution can include one or more computer programs which execute in one or more computers coupled to one another over one or more computer communications networks interconnected to one another through switching resources including routers. The solution further can include one or more data storage resources, such as one or more database management systems.

Different log files 130 for different resources of the computer data processing system 120 can be produced during the operation of the computer data processing system 120 including a duration of time when a fault has occurred in respect to the solution which resulted in the fault report 140. The fault report 140 itself can include a formalized report of the occurrence of a report, or a message transmitted to the end user 110 specifying a nature of the fault. In any case, a resource list 150 can be extracted from the fault report 140. For example, references to different resources of the computer data processing system 120 within the fault report 140 can be extracted from the fault report 140 and aggregated into a resource list 150 of at least two resources determined to be relevant to the fault report 140.

Optionally, one or more resources of the computer data processing system 120 that are disposed between a communicative pathway between the resources of the resource list 150 can be included in the aggregation of relevant resources. Thereafter, log file reduction logic 160 can apply a filter 170 to the log files 130 to generate a subset 180 of the logs 130 related only to the relevant resources of the resource list 150. The subset 180 of the logs 130 in turn can be provided to the end user 110 so that the end user 110 can conduct keyword searching against a reduced set of the logs 130 relevant to the resources of the computer data processing system 120 associated with the fault report 140.

Figure 2:
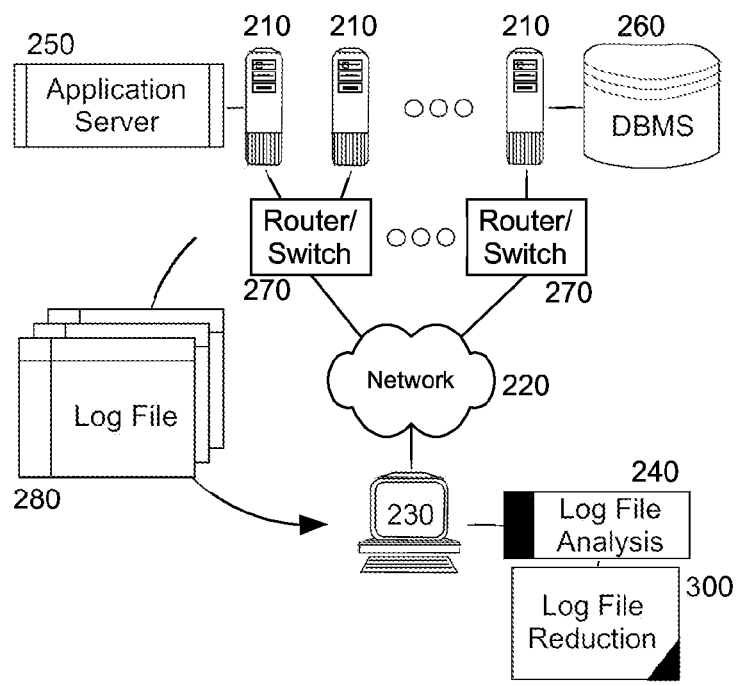
FIG. 2 is a schematic illustration of a computer data processing system configured for log file reduction according to problem space topology; and, FIG. 3 is a flow chart illustrating a process for log file reduction according to problem space topology.

In yet further illustration, FIG. 2 schematically depicts a computer data processing system configured for log file reduction according to problem space topology. The system can include one or more computers 210, each with memory and at least one processor supporting the operation of one or more computer programs in an operating system or virtual machine. The computer programs can include data processing applications, database management applications managing data in one or more coupled databases 260, or even an application server 250 acting as a container to other computer programs. The computers 210 can be coupled to one another over a computer communications network 220 by way of one or more switches 270, including, for example, intelligent switches or routers.

A client 230 can be coupled to the computer data processing system over the computer communications network 220. The client 230 can include a log file analysis application 240 configured to keyword search loaded log files 280 provided by the computer data processing system. Importantly, however, a log file reduction module 300 can be coupled to the log file analysis application 240 and configured upon execution in the memory of the client 230 to reduce the log files 280 to a subset for keyword searching in the log file analysis application 240 based upon references to one or more resources of the computer data processing system within a fault report for a fault of the computer data processing system. In this regard, the resources can include not only the computers 210, but also the applications executing therein, the switches 270, the application servers 250 and the databases 260.

Figure 3:
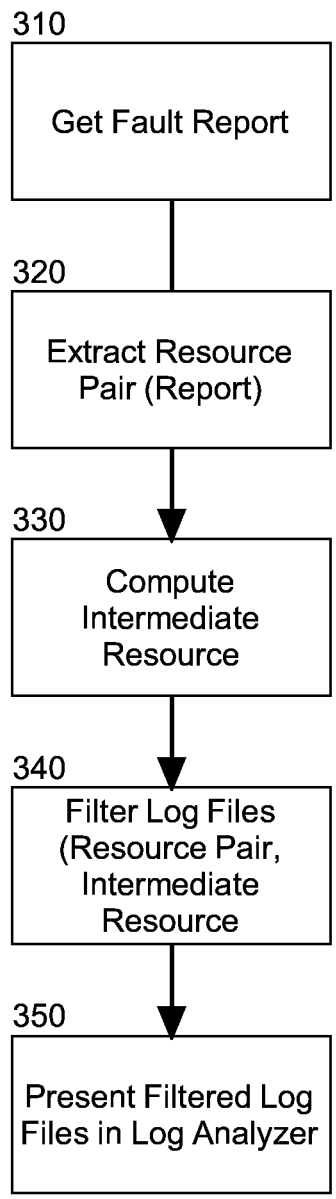

In even yet further illustration of the operation of the log file reduction module 300, FIG. 3 is a flow chart illustrating a process for log file reduction according to problem space topology. Beginning in block 310, a fault report can be received for a fault in the operation of a computing solution executing within a computer data processing system. For example, the fault can be a run-time error in operation, a hardware failure, a failure of computer interroperations or a failure of communications, to name only a few examples. The fault report can be a message transmitted by an end user including reference not only to the nature of the fault, but also the message can enumerate one or more resources associated with the fault.

In block 320, two or more resources referenced within the fault report can be extracted from the fault report and in block 330, one or more resources can be computed as being disposed in a communications pathway between the two or more resources referenced in the fault report. Thereafter, in block 340 the log files for the computer data processing system can be filtered into a subset of log files including only those log files affiliated with the two or more resources of the fault report and the computed intermediate resources. Finally, in block 350 the subset of log files can be presented in a user interface and can be subjected to keyword searching.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for log file reduction according to problem space topology, the method comprising:
   receiving a fault report for a fault in a solution executing in memory of one or more computers of a computer data processing system;
   processing the fault report so as to extract a resource list identifying references to resources in connection with the occurrence of different faults;
   selecting at least two of the identified resources of the computer data processing system from the fault report;
   computing an intermediate resource as being disposed in a communications pathway between the selected at least two of the identified resources in the resource list;
   applying a filter to a set of all log files for the computer data processing system with the selected resources and the intermediate resource that is disposed between the communications pathway between the selected at least two of the identified resources in the resource list, in order to produce a subset of log files related to the selected and intermediate resources;
   displaying the subset of log files in a log file analyzer; and,
   applying a keyword search against the subset of the log files.

2. The method of claim 1, wherein the fault report is a message from an end user of the solution.

3. The method of claim 1, wherein the resources are resources selected from the group consisting of computers in the computer data processing system and switches utilized in a computer communications network communicatively coupling together the computers.

4. The method of claim 1, wherein the resources are applications executing in memory of computers in the computer data processing system.

* * * * *